US008504012B2

(12) United States Patent
Park et al.

(10) Patent No.: US 8,504,012 B2
(45) Date of Patent: Aug. 6, 2013

(54) SYSTEM AND METHOD FOR PROVIDING BROADCAST SERVICES IN BROADBAND WIRELESS ACCESS SYSTEM

(75) Inventors: Chul Park, Daejeon-si (KR); Sang-ho Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 642 days.

(21) Appl. No.: 12/642,433

(22) Filed: Dec. 18, 2009

(65) Prior Publication Data

US 2010/0159918 A1 Jun. 24, 2010

(30) Foreign Application Priority Data

Dec. 22, 2008 (KR) ........................ 10-2008-0131577

(51) Int. Cl.
H04W 24/00 (2009.01)
H04W 24/08 (2009.01)
H04W 48/16 (2009.01)
H04W 4/06 (2009.01)
H04W 80/04 (2009.01)
H04B 7/216 (2006.01)

(52) U.S. Cl.
USPC ........... 455/423; 455/434; 370/312; 370/320; 370/331

(58) Field of Classification Search
USPC .................................. 455/423, 434
See application file for complete search history.

(56) References Cited

U.S. PATENT DOCUMENTS

| 7,953,167 | B2 | 5/2011 | Ode et al. | |
|---|---|---|---|---|
| 2005/0053023 | A1* | 3/2005 | Rajkotia et al. | 370/312 |
| 2008/0192675 | A1 | 8/2008 | Kim et al. | |
| 2008/0316969 | A1* | 12/2008 | Prakash et al. | 370/331 |
| 2009/0109890 | A1* | 4/2009 | Chow et al. | 370/312 |

FOREIGN PATENT DOCUMENTS

| KR | 1020070058683 | 6/2007 |
|---|---|---|
| KR | 10-2007-0110907 | 11/2007 |
| KR | 10-2008-0075811 | 8/2008 |
| WO | WO-2006/096679 A1 | 9/2006 |

* cited by examiner

*Primary Examiner* — Timothy Pham
(74) *Attorney, Agent, or Firm* — Nelson Mullins Riley & Scarborough LLP; EuiHoon Lee, Esq.

(57) ABSTRACT

Disclosed are a system and method for providing broadcast services in a broadband wireless access system. According to an exemplary embodiment, by allowing a terminal to receive broadcast service data using carrier information that is used to provide a broadcast service received from a base station and performing other communication except for the broadcast service using other carriers except for the carrier used to provide the broadcast service, efficient use of carrier frequency resources without any loss is achieved.

2 Claims, 3 Drawing Sheets

SYSTEM AND METHOD FOR PROVIDING BROADCAST SERVICES IN BROADBAND WIRELESS ACCESS SYSTEM

CROSS-REFERENCE TO RELATED APPLICATION

This application claims the benefit under 35 U.S.C. §119(a) of Korean Patent Application No. 10-2008-131577, filed on Dec. 22, 2008, the disclosure of which is incorporated by reference in its entirety for all purposes.

BACKGROUND

1. Field

The following description relates to a technology of providing broadcast services in a broadband wireless access system.

2. Description of the Related Art

Recently, a broadband wireless access system has been introduced in which a terminal communicates with a base station through multiple carrier frequencies.

In a broadband wireless access system, a base station, in a broadcast mode, transmits broadcast service data through a plurality of carriers to all terminals belonging to the base station so that all terminals can receive the same broadcast service data.

At this time, the base station has to simultaneously transmit the same broadcast service data to the terminals using all carriers managed by the base station. This is because a terminal which wants to receive a broadcast service may arbitrarily select and use all or some of the plurality of carrier frequencies managed by the base station.

Accordingly, the base station uses all carrier frequencies managed by itself to transmit the same broadcast service data, which may lead to inefficient usage of its radio resources.

SUMMARY

The following description relates to a system and method for providing broadcast services by transmitting broadcast service data using a plurality of carrier frequencies in consideration of efficiency of radio resources in a broadband wireless access system.

According to an exemplary aspect, there is provided a method by which a terminal receives a broadcast service in a broadband wireless access system which performs communications using a plurality of carrier frequencies, the method including: receiving, from a base station, system information needed for communication between the terminal and the base station; and receiving broadcast service data from the base station, using at least one piece of carrier frequency information included in the received system information, the at least one piece of carrier frequency information to be used to provide the broadcast service.

The receiving of the system information includes: measuring intensities of signals received from the base station when the terminal initially accesses the base station; and setting a carrier of a signal whose intensity is maximum among the measured intensities of the signals, to the primary carrier component.

The receiving of the broadcast service data includes: determining whether the at least one piece of carrier frequency information to be used to provide the broadcast service is identified as the primary carrier component; if the at least one piece of carrier frequency information to be used to provide the broadcast service is not identified as the primary carrier component, selecting another at least one piece of carrier frequency information included in the system information as a secondary carrier frequency, and receiving broadcast service data from the base station using the secondary carrier frequency; and if the at least one piece of carrier frequency information to be used to provide the broadcast service is identified as the primary carrier component, selecting as a secondary carrier component at least one of the plurality of carrier frequencies and performing communication with the base station using the secondary carrier component.

The method further includes: if the at least one piece of carrier frequency information to be used to provide the broadcast service is not included in the received system information, checking whether reception of the broadcast service data has been abandoned; and if the reception of the broadcast service data has been abandoned, selecting as a secondary carrier component at least one of the plurality of carrier frequencies and performing communication with the base station using the at least one secondary carrier component; and if the reception of the broadcast service has not been abandoned, searching for a carrier frequency from another base station.

According to another exemplary aspect, there is provided a method by which a base station provides a broadcast service, including: determining whether any error is found in a system which provides a broadcast service; and if no error is found in the system which provides the broadcast service, selecting at least one carrier that is to be used to provide the broadcast service from among a plurality of carriers being operated, inserting the selected at least one carrier frequency into system information for communication between a terminal and the base station, and transmitting the resultant system information at regular time intervals.

The method further includes transmitting broadcast service data using the selected at least one carrier.

The method further includes if any error is found in the system which provides the broadcast service, transmitting the system information at regular time intervals without including at least one carrier that is to be used to provide the broadcast service in the system information.

According to an exemplary aspect, there is provided a system of providing a broadcast service, including: a base station to select at least one carrier that is to be used to provide a broadcast service from among a plurality of carriers being operated, to insert the at least one carrier into system information for communication between the base station and a terminal, and to transmit broadcast service data at regular time intervals using the selected at least one carrier; and a terminal to receive the broadcast service data from the base station, using the at least one carrier included in the system information received from the base station, and to be used to provide the broadcast service.

The terminal receives system information from the base station using a primary carrier component among carriers of signals received from the base station when the terminal initially accesses the base station, wherein the primary carrier component is a carrier of a signal having the greatest intensity among signals received from the base station.

According to the above-described embodiments, by transmitting broadcast service data only through specified one or several carrier frequencies, repeated transmission of broadcast service data is prevented and accordingly carrier frequency resources that have been used for such repeated transmission of broadcast service data are reserved to be able to be used for transmission of other data, which contributes to the efficient use of radio resources.

Furthermore, according to the above-described embodiments, since a terminal selects specific carrier frequencies to be used to provide a broadcast service among carrier frequencies that the terminal can use, based on system information received from a base station for communication between the terminal and base station, the terminal may quickly select the carrier frequencies to be used to provide the broadcast service.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
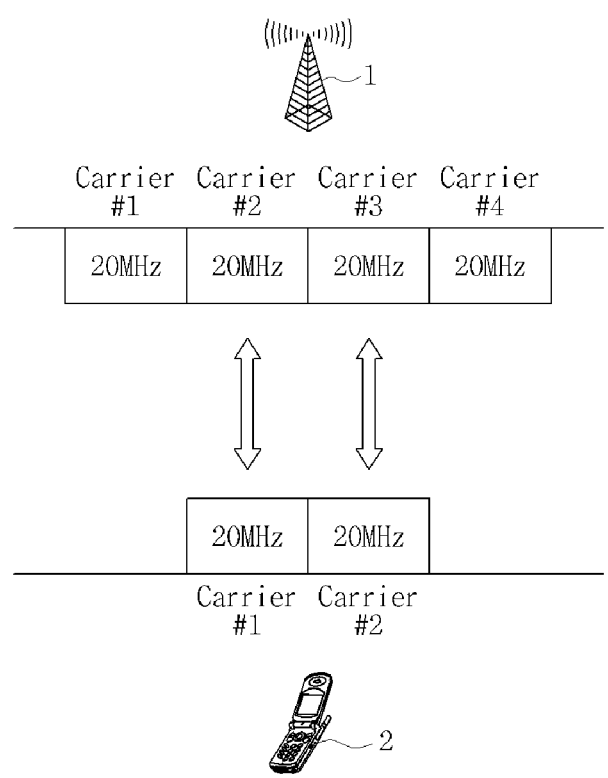
FIG. 1 illustrates a broadcast providing system in a broadband wireless access system according to an exemplary embodiment.

FIG. 1 illustrates a broadcast providing system in a broadband wireless access system according to an exemplary embodiment.

As illustrated in FIG. 1, the broadcast service providing system includes a base station 1 and a terminal 2. For convenience of description, FIG. 1 shows a single terminal, but a plurality of terminals may be located in the cell of the base station.

The base station 1 selects at least one carrier frequency that is to be used to provide a broadcast service from among a plurality of carrier frequencies which the base station 1 manages, includes the selected carrier frequency in system information for communications between the terminal 2 and base station 1, transmits the system information at regular time intervals to the terminal 2, and then transmits broadcast service data to the terminal 2 using the carrier frequency to be used to provide the broadcast service. In the current embodiment, the plurality of carrier frequencies which the base station 1 manages are Carrier #1, Carrier #2, Carrier #3 and Carrier #4 each having a bandwidth of 20 MHz. The system information is to establish communications between the terminal 2 and base station 1 and includes information required for the terminal 2 to stably communicate with the base station 1. The system information, for example, includes physical layer-related information, scheduling information and the like.

According to an exemplary embodiment, the base station 1, before including the carrier frequency to be used to provide the broadcast service in the system information, may check if any error is found in a system which provides the broadcast service. That is, the base station 1, if no error is found in the system which provides the broadcast service, may include information about at least one carrier frequency to be used to provide the broadcast service in the system information, and then transmit the system information at regular time intervals to the terminal 2. If errors are found in the system which provides the broadcast service, the base station 1 may, without including the information about the carrier frequency to be used to provide the broadcast service in the system information, transmit the system information to the terminal 2 at regular time intervals.

Then, the terminal 2 receives broadcast service data from the base station 1, using the carrier frequency included in the system information received from the base station1 and to be used to provide the broadcast service.

The terminal 2 may receive the system information from the base station 1, using a primary carrier component among carrier frequencies of signals received from the base station 1 when the terminal 2 initially accesses the base station 1, wherein the first carrier component may be a carrier frequency of a signal having the greatest intensity among the signals received from the base station 1 when the terminal 2 initially accesses the base station 1.

According to another exemplary embodiment, the terminal 2 may determine whether any of at least one carrier frequency that is to be used to provide the broadcast service is identified as the primary carrier component. If the terminal 2 determines that no carrier frequency that is to be used to provide the broadcast service is identified as the primary carrier component, the terminal 2 may select as a secondary carrier component one of carrier frequencies included in the system information received from the base station 1 and to be used to provide the broadcast service, and receive broadcast service data from the base station 1 using the secondary carrier component. For example, referring to FIG. 1, if the primary carrier component is Carrier #1 and the carrier frequency to be used to provide the broadcast service is Carrier #2, the primary carrier component is different from the carrier frequency to be used to provide the broadcast service and accordingly the terminal 2 may select the carrier frequency Carrier #2 as a carrier frequency to be used to provide the broadcast service and receive broadcast service data from the base station 1 using the carrier frequency Carrier #2.

Meanwhile, the terminal 2, if any one of the carrier frequencies to be used to provide the broadcast service is identified as the primary carrier component, may select as a secondary carrier component at least one of the carrier frequencies of the signals received from the base station 1 when the terminal 2 initially accesses the base station 1 and may communicate with the base station 1 using the secondary carrier component. That is, the terminal 2 performs multi-carrier communications with the base station 1 using the primary carrier component and secondary carrier component. In the current embodiment, a plurality of secondary carrier components may be selected according to the performance of the terminal 2, that is, the transmission rate of the terminal 2.

The reason for selecting at least one separate carrier frequency in addition to selecting at least one carrier frequency to be used to provide a broadcast service is because the transmission speed for communications between a terminal and a base station is N times higher than that of when only one carrier is used for communications between a terminal and a base station, wherein N is the number of carriers used.

According to another exemplary embodiment, if no information about at least one carrier frequency to be used to provide the broadcast service is included in the received system information, the terminal 2 may check if reception of broadcast service data has been abandoned. If reception of broadcast service data has been abandoned, the terminal 2 selects at least one secondary carrier component from among the carrier frequencies of the signals received from the base station 1 when the terminal 2 initially accesses the base station 1, and communicates with the base station 1 using the secondary carrier component. If reception of broadcast service data has not been abandoned, the terminal 2 may search for a primary carrier component from another base station. This is the case of seeking another base station which is transmitting broadcast data.

Figure 2:
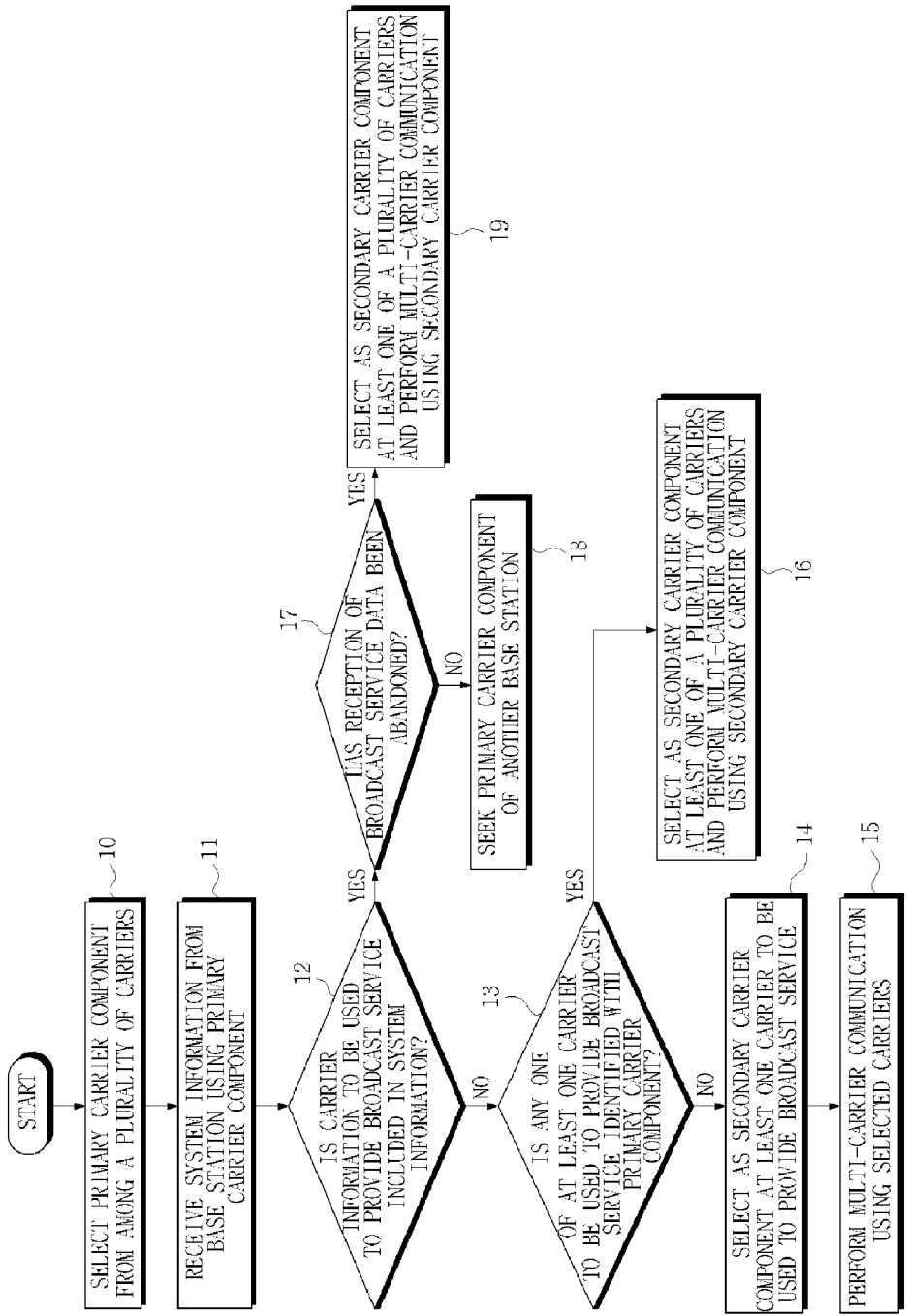
FIG. 2 is a flowchart illustrating a method by which a terminal receives broadcast services in a broadband wireless access system, according to an exemplary embodiment.

FIG. 2 is a flowchart illustrating a method by which a terminal receives broadcast services in a broadband wireless access system, according to an exemplary embodiment.

As illustrated in FIG. 2, a terminal selects a primary carrier component from among a plurality of carriers (operation 10). Here, the plurality of carriers may be carrier frequencies received from a base station when the terminal initially accesses the base station, and the primary carrier component may be a carrier frequency of a signal having the greatest intensity among the signals received from the base station.

Then, the terminal receives system information from the base station using the primary carrier component (operation 11). Here, the system information is information the terminal has to acquire for communication between the terminal and base station, and as an example, the system information includes physical layer-related information, scheduling information and the like.

Then, the terminal checks if at least one piece of carrier frequency information that is to be used to provide a broadcast service is included in the received system information (operation 12). If at least one piece of carrier frequency information that is to be used to provide a broadcast service is included in the received system information, the terminal determines if a primary carrier component is identified as any one of the at least one carrier frequency that is to be used to provide the broadcast service (operation 13).

If any one of the at least one carrier frequency to be used to provide the broadcast service is identified as the primary carrier component, the terminal selects as a secondary carrier component at least one of the plurality of carrier frequencies and performs multi-carrier communications with the base station using the secondary carrier component (operation 16).

Meanwhile, if it is determined in operation 13 that any carrier frequency to be used to provide the broadcast service is not identified as the primary carrier component, the terminal selects as a secondary carrier component at least one of carriers included in the system information, the selected carrier to be used to provide the broadcast service (operation 14). Then, the terminal receives broadcast service data from the base station using the second carrier component (operation 15).

If it is determined in operation 12 that no information about at least one carrier frequency to be used to provide the broadcast service is included in the system information, the terminal checks if reception of broadcast service data has been abandoned (operation 17). If reception of broadcast service data has been abandoned, the terminal selects as a secondary carrier component at least one of the plurality of carriers and performs multi-carrier communication with the base station using the secondary carrier component (operation 19).

Meanwhile, if reception of broadcast service data has not been abandoned, the terminal searches for a primary carrier component from another base station (operation 18). This is the case of seeking another base station which is transmitting broadcast data.

Figure 3:
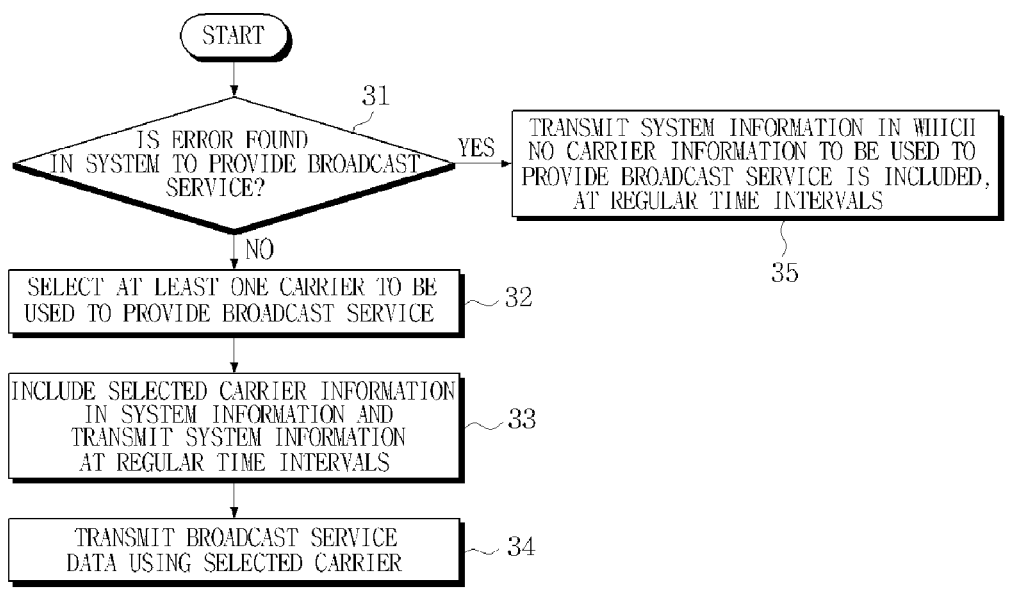
FIG. 3 is a flowchart illustrating a method by which a base station provides broadcast services in a broadband wireless access system, according to an exemplary embodiment.

FIG. 3 is a flowchart illustrating a method by which a base station provides broadcast services in a broadband wireless access system, according to an exemplary embodiment.

As illustrated in FIG. 3, the base station checks if any error is found in a system which provides a broadcast service (operation 31). If no error is found in the system, the base station selects at least one carrier to be used to provide the broadcast service from among a plurality of carrier frequencies that the base station manages (operation 32).

Then, the base station includes information about the selected carrier in system information for communications between the terminal and base station, and transmits the system information to the terminal at regular time intervals (operation 33). The system information is information the terminal has to acquire for communications between the terminal and base station, and for example the system information includes physical layer-related information, scheduling information and the like. Thereafter, the base station transmits broadcast service data using the selected carrier frequency (operation 34).

Meanwhile, if it is determined in operation 31 that errors are found in the system which provides the broadcast service, the base station transmits system information to the terminal at regular time intervals, without including the carrier information to be used to provide the broadcast service in the system information (operation 35).

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A method by which a terminal receives a broadcast service in a broadband wireless access system which performs communications using a plurality of carrier frequencies, the method comprising:

receiving, from a base station, system information needed for communication between the terminal and the base station using a primary carrier component, wherein a carrier of a signal whose intensity is maximum among intensities of signals received from the base station when the terminal initially accesses the base station is set to the primary carrier component; and receiving broadcast service data from the base station, using at least one carrier component included in the received system information, wherein the receiving of the broadcast service data from the base station comprises:

determining whether the at least one piece of carrier component is identified as the primary carrier component;

when the at least one carrier component to be used to provide the broadcast service is not identified as the primary carrier component, selecting at least one carrier component included in the system information as a secondary carrier frequency, and receiving broadcast service data from the base station using the secondary carrier frequency; and when the at least one carrier component to be used to provide the broadcast service is identified as the primary carrier component, selecting at least one carrier component, which received signals from the base station when the terminal initially accesses the base station, as a secondary carrier component and performing communication with the base station using the secondary carrier component.

2. A method by which a terminal receives a broadcast service in a broadband wireless access system which performs communications using a plurality of carrier frequencies, the method comprising:
- receiving, from a base station, system information needed for communication between the terminal and the base station using a primary carrier component, wherein a carrier of a signal whose intensity is maximum among intensities of signals received from the base station when the terminal initially accesses the base station is set to the primary carrier component; and
- receiving broadcast service data from the base station, using at least one carrier component included in the received system information,
- wherein the receiving broadcast service data from the base station comprises:
- determining whether the at least one carrier component is identified as the primary carrier component;
- when the at least one carrier component to be used to provide the broadcast service is not identified as the primary carrier component, selecting at least one carrier component included in the system information as a secondary carrier frequency, and receiving broadcast service data from the base station using the secondary carrier frequency;
- when the at least one carrier to be used to provide the broadcast service is identified as the primary carrier component, selecting at least one carrier component, which received signals from the base station when the terminal initially accesses the base station, as a secondary carrier component and performing communication with the base station using the secondary carrier component;
- when the at least one carrier component to be used to provide the broadcast service is not included in the received system information, checking whether reception of the broadcast service data has been abandoned;
- when the reception of the broadcast service data has been abandoned, selecting at least one carrier component, which received signals from the base station when the terminal initially accesses the base station, as a secondary carrier component and performing communication with the base station using the secondary carrier component; and
- when the reception of the broadcast service has not been abandoned, searching for a carrier frequency from another base station.

\* \* \* \* \*